July 31, 1945.  C. F. WETHERBEE  2,380,565

DILATOMETER

Filed May 12, 1943  2 Sheets-Sheet 1

INVENTOR.
Charles F. Wetherbee
BY
E. C. Sanborn
Attorney

July 31, 1945.   C. F. WETHERBEE   2,380,565
DILATOMETER
Filed May 12, 1943   2 Sheets-Sheet 2

INVENTOR.
Charles F. Wetherbee
BY E.C. Sanborn
Attorney

Patented July 31, 1945

2,380,565

UNITED STATES PATENT OFFICE 2,380,565

DILATOMETER

Charles F. Wetherbee, Naugatuck, Conn., assignor to The Bristol Company, Waterbury, Conn., a corporation of Connecticut Application May 12, 1943, Serial No. 486,678

13 Claims. (Cl. 73—16)

This invention relates to dilatometers or expansometers, and more especially to an instrument for the purpose of providing a continuous graphic record of the temperature-expansion characteristics of solid specimens, and including a device for compensating for expansion of parts of the instrument due to heat transmitted between the specimen-temperature-affecting element and said parts.

Prior dilatometer apparatus of well-known type embodies a furnace for heating a specimen between a normally fixed and a normally movable abutment, together with a mechanical linkwork which rotates a circular chart in accord with changes in the linear spacing between said abutments. A relay-type pyrometer mechanism responsive to a thermocouple embedded in the specimen moves a recording pen in a sense generally radially of said chart. There is thus provided a graph of linear expansion with reference to temperature change and taking the form of a diagram on the chart, subject to interpretation in terms of the characteristics of the specimen, whereby there may be determined important data with respect to its properties, including transformation points and other phenomena attending changes in temperature of the material composing the specimen.

The polar record obtained from the above-described instrument, while informative, is difficult of interpretation, and is not plotted in a form which provides immediate visual concept of the characteristics of the material; and in many cases it has been the practice of engineers using that type of instrument, to transcribe the record into the form of a diagram based on a system of rectangular coordinates before attempting to utilize the readings obtained. It has been found, moreover, that in expansion-measuring instruments wherein cognizance is taken only of changes in length of the specimen under investigation, considerable errors may develop due to expansion or distortion of the framework of the instrument itself. Temperature effects due to heat transmitted from the furnace, as well as those due to ambient conditions, will distort the supporting parts; and where measurement is made between definite abutments on the specimen, such distortion may produce between these abutments variations in linear dimensions, which besides being of considerable magnitude are likely to differ materially in individual instruments, and also in accordance with the durations of respective tests.

It is an object of the present invention to provide a dilatometer which will provide a graph of expansion against temperature in the form of a diagram directly inscribed on a chart having rectangular coordinates.

It is a further object to provide an instrument which will inscribe a diagram of the above nature, and will also show on the same chart a record of time elapsed during the test.

It is a further object to provide an instrument of the above class which shall be applicable to the testing of specimens of a wide variety of dimensions.

It is a further object to provide an instrument in which the record of dimensional changes shall represent solely those of the specimen under test, and shall not be affected by fortuitous variations in the dimensions of the specimen-supporting structure or other elements of the instrument.

It is a further object to provide an instrument of the above class in which cooling curves characterizing quenching operations shall be obtainable with the same facility as heating curves, and, if desired, in immediate sequence thereafter.

It is proposed to provide a dilatometer having a drum rotated in proportion to the changes in temperature of a specimen under investigation, whereby a graduated chart will be moved in accordance with said changes, and having also a pen or stylus moved relatively to said chart through a link-work in response to dimensional changes in said specimen, whereby the desired form of diagram will be drawn. It is further proposed to include in said linkwork a differential member, responsive both to the dimensional changes to be recorded and to spurious dimensional changes, whereby the latter may be excluded from the resultant movement of the pen or stylus with respect to the chart.

In the drawings:

Fig. 5 is an end elevation of a portion of the mechanism of the apparatus shown in Fig. 1.

Figure 1:
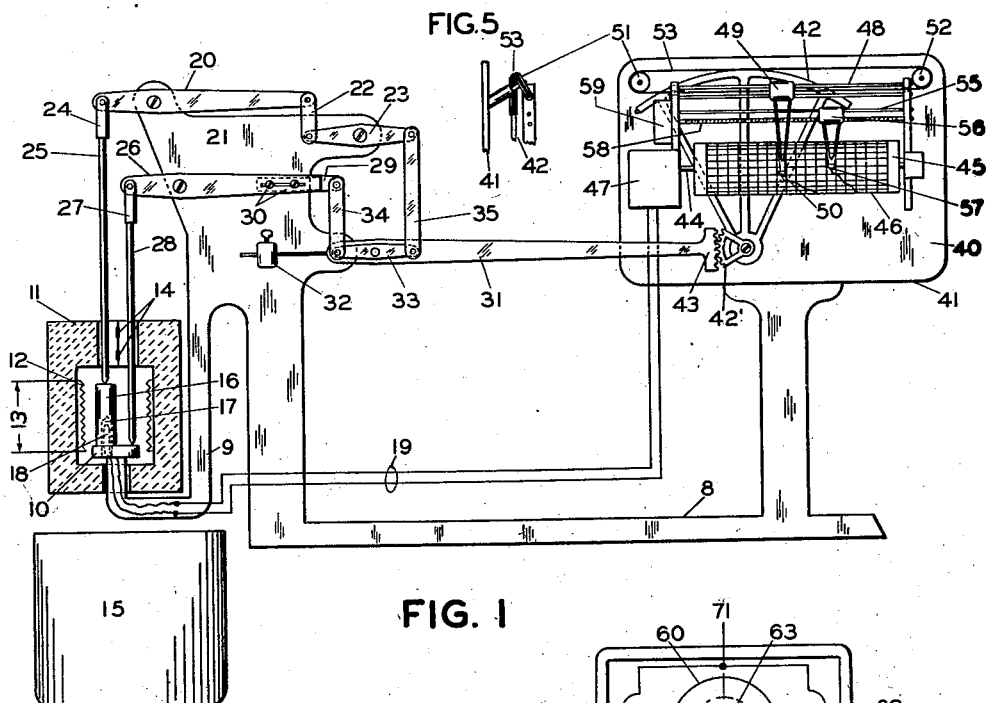
Fig. 1 is a side elevation of a dilatometer embodying the principles of the invention.

Referring now to the drawings:

A mounting base 8 includes a downwardly extending bracket portion or "gooseneck" 9, supporting a pedestal 10 enclosed in a furnace 11, and adapted to form one abutment for a specimen of solid material whose dimensional changes under conditions of controlled temperature variation are to be determined. The furnace 11 comprises a thermally insulating enclosure forming a cavity or chamber within the lower part of which is positioned the pedestal 10, and upon the interior walls of which are mounted electric heating elements 12 adapted to be energized from a source of electric energy 13 and to communicate heat to the interior of the furnace and to such objects as may be placed within the same. The furnace 11 is provided with vertically disposed hinges 14, whereby it may readily be opened and removed from the specimen for the purpose of quenching the latter, which is accomplished by elevating a tank 15 containing suitable quenching liquid to quickly and completely immerse the specimen and its immediate supporting structure after the furnace has been removed. The mechanism for supporting the furnace, and that for elevating the quenching tank are well known; and, as they form no part of the present invention, are not herein described.

A specimen 16 of the material to be investigated, is formed generally to a cylindrical conformation and provided with an internally bored cavity 17 adapted to contain a thermocouple 18 whereby the temperature of said specimen may be determined. The specimen 16 is placed vertically upon the pedestal 10 within the furnace 11, and the terminals of the thermocouple are brought out through suitable openings in the wall of the furnace to conductors 19.

A horizontally disposed lever member 20, fulcrumed upon a bracket 21 forming a part of the base 8 and adapted for movement through a limited angle in a vertical plane, is provided with a short arm having its extremity vertically above the specimen 16, and an oppositely extending long arm pivotally attached by a link 22 to one of the two equal arms of a horizontal lever 23 also fulcrumed on the bracket 21 for limited movement in a vertical plane. A clamping member 24 pivotally attached to the extremity of said short arm of lever member 20 carries an extended rod 25 of quartz or similar refractory material of low temperature coefficient of expansion, passing through a suitable opening in the top of the furnace and having its lower extremity resting in contact with the upper end of the specimen 16, forming an abutment adapted to be moved with linear expansion of said specimen, and adapted to communicate said motion to the lever member 20.

Fulcrumed upon the bracket 21 is a lever member 26 normally substantially parallel to the lever member 20, and like said last-named lever member, provided with a short arm and a long arm and adapted for limited angular motion in a vertical plane. A clamping member 27 pivotally attached to the extremity of said short arm of lever member 26 carries an extended rod 28 of quartz or similar material, substantially identical with the rod 25, and also passing through the top of the furnace. The lower end of the rod 28 rests on the pedestal 10 alongside the specimen 16, and is exposed to the same temperature conditions as said specimen. The long arm of the lever member 26 comprises a longitudinally movable section 29 carrying a pivot bearing, and adapted to be variously positioned with respect to the body of the lever, and secured in a selected position by means of clamping screws 30. The ratio of the arms of the lever member 26 is thus made adjustable; and, while said ratio is nominally the same as that of the arms of the lever member 20, it is subject to modifications as hereinafter pointed out.

A horizontally extended lever 31 is fulcrumed at one of its extremities to the bracket 21 for limited angular movement in a vertical plane to transmit motion to recording mechanism hereinafter to be described. The axis of rotation of the lever 31 is located substantially vertically below the normal position of the pivot bearing carried by the long arm of the lever member 26. The lever 31 may be provided with a counterweight 32, tending to maintain said lever in a state of neutral equilibrium. Pivotally mounted on the lever 31, a short distance from the mounting of the latter, and in the same direction therefrom as said lever is extended is a floating lever or "whiffletree" 33, having horizontally extended equal arms carrying pivot bearings. The horizontal spacing of the several pivot bearings of the lever 33 are such that the axis of the bearing carried by the arm which is extended back toward the mounting of the lever 31 will coincide with the axis of the fulcrum of the lever 31 when levers 31 and 33 are both in a horizontal position, and the axis of the bearing carried by the arm of the lever 33 which is extended away from the pivot bearing of the lever 31 will lie substantially vertically below the axis of the pivot bearing of the short lever 23 carried by the arm of said last-named lever remote from the bearing to which the link 22 is attached.

The first-named of said pivot bearings on the lever 33 is attached by means of a link 34 to the bearing on the long arm of the lever 26; and the last-named of said pivot bearings on the lever 33 by means of a link 35 to the first named of said pivot bearings of the short lever 23. The extended lever 31 is thus made subject to the joint influence of the links 34 and 35, and, having such influence applied between its fulcrum and the extremity at which motion derived from said influence is to be utilized, will be recognized as a lever of the third class.

Operation of the mechanism as thus far disclosed may be described as follows: Assume the apparatus to be assembled as indicated in Fig. 1, with a specimen 16 in place, and the rods 25 and 28 brought into firm contact with the specimen and its supporting pedestal respectively, and if desired so maintained by adjusting the counterweight 32 to impart to the lever 31 a slight turning moment in a counter-clockwise sense. It will be apparent that an increase in the length of the specimen 16 resting on the fixed pedestal 10 will be transmitted as an upward movement of the rod 25 to the short arm of the lever 20, and will produce a greater and downward movement of the long arm of the same. Said last movement, being transmitted through the link 22 to one arm of the lever 23, will produce an equal upward movement of the other arm, which, in turn, will be transmitted through the link 35 to the floating lever 33. Assuming for the moment that the link 34, carrying the opposite arm of the lever 33, is stationary, it will be obvious that the lever 33, in response to movement of the link 35, will be rotated through an angle about the axis of the pivot bearing supported by the link 34; and that, as said axis substantially coincides with the axis of rotation of the lever 31 to which the lever 33 is attached, the said lever 31 will be rotated through a similar angle, and its extended arm will be displaced upward to a degree directly representative of the linear expansion of the specimen 16, and in a quantitative relationship thereto magnified according to the ratios of the respective arms of the several lever members constituting the linkwork.

In the forms of dilatometer heretofore known to the art, the transmitted displacement of which a measure is made is, as in the example hereinabove described, that represented by a change in the vertical distance between the upper surface of the pedestal 10 and the pivot bearing of the lever 20, representing the combined expansion of the specimen and the rod 25, and making no allowance for such dimensional changes as may take place in the supporting framework of the instrument due to temperature variation or other causes. It has been found that, while a number of such effects may by careful design of the parts, be reduced to negligible magnitudes, the expansion of the supporting bracket due to unavoidable heat transmission from the furnace (especially when that bracket as shown in Fig. 1 takes a "gooseneck" form to facilitate quick immersion in a quenching bath) is not only erratic but may be of sufficient magnitude to introduce appreciable errors in the final results. The function of the lever member 26 and associated parts in eliminating this source of error is as follows: In the event of any change taking place in the longitudinal dimensions of the bracket 9, the vertical distances between the pedestal 10 and the pivot bearing of the lever 20 and between said pedestal and the bearing of the lever 26, will both be correspondingly changed. Assuming this change to be in the nature of an extension, due, for example to expansion of the bracket 9, the resultant action on the linkwork will be for both the levers 20 and 26 to be rotated in a counter-clockwise sense about their bearings, causing the right-hand ends of said levers, as seen in Fig. 1 to be elevated.

Upward motion of the right-hand extremity of the lever 20 will be communicated through the link 22 to the left-hand extremity of the lever 23; and, this lever having equal arms, an equal downward motion will be imparted to the link 35 and thence to the right-hand end of the floating lever 33. At the same time, upward motion of the right-hand extremity of the lever 26 will be transmitted through the link 34 to the left-hand end of the floating lever 33; and since the over-all ratios of the long and short arms of the levers 20 and 26 are made equal, and both the lever 23 and the lever 33 have arms of equal lengths, the resulting displacement of the mid-point pivot bearing of the floating lever 33 will be nil; and the extended lever 31 will receive no motion due to changes in dimensions of the bracket 9 or to other influences tending to vary the vertical distance between the pedestal 10 and other nominally fixed points of the structure. While the expansion of quartz may generally be considered as negligible in comparison with that of metals, yet in such tests as are of sufficient precision to demand allowance for the difference in expansion of the rods 25 and 28 due to the greater length of the latter lying in the heated zone of the furnace, this allowance may be made in the nature of a compensation by modifying the ratio of the arms of the lever member 26 as made possible by the adjustable section 29. Said section may be longitudinally shifted through a slight distance, correspondingly changing the horizontal distance between the fulcrum of the lever 26 and the point of support of the link 34, and secured by the screws 30 in the desired position, whereby the desired compensation is effected, and the displacement of the extended lever 31 made directly proportional to the dilation of the specimen 16, and to no other variable.

The mechanism by which the displacement of the lever 31 is utilized to provide a graphic record of the desired nature comprises a recording instrument 40 having the following elements in combination: Mounted upon the base 8 is a plate 41 having a sector 42 journalled thereon about an axis parallel to those of the fulcrums of the levers 20 and 26, and carrying a gear member 42' adapted to mesh with a gear portion 43 terminating the extended lever 31, whereby a small angular displacement of the latter will effect a relatively large angular deflection of the said sector 42. Journalled on suitable pedestals carried by the plate 41 is a shaft 44 carrying a drum 45, and arranged for rotation about an axis substantially parallel to the normal extended direction of the lever 31, and adapted to have mounted thereon a record chart 46 of the general nature shown in Fig. 4, for the purpose of having a graph inscribed thereon. Rotation of the chart drum 45 is effected by means of a mechanism 47 comprising a relay system to which are connected the conductors 19 from the thermocouple 18, whereby the angular displacement of the shaft 44 is made proportional to changes in temperature as measured by said thermocouple, said displacement from a selected zero of reference thus being a measure of the temperature of the specimen 16 in which said couple is embedded. The principle of the mechanism 46 is preferably identical with that fully set forth in allowed Application Serial No. 363,275, filed by F. B. Bristol, October 29, 1940, now Patent No. 2,320,066, issued May 25, 1943, wherein he disclosed means whereby a shaft is rotated through an angle directly proportional to a temperature as measured by a thermocouple, and for which principle no invention is herein claimed.

Figure 3:
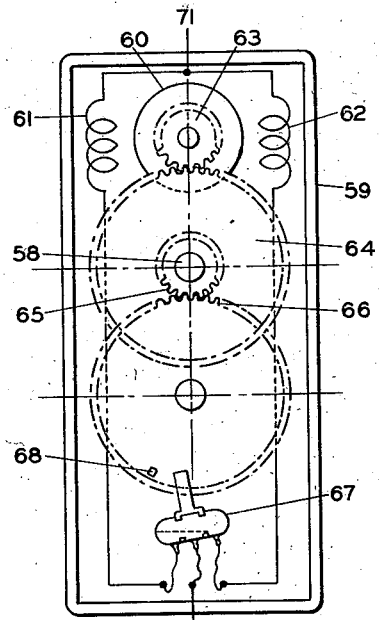
Fig. 3 shows to an enlarged scale a timing mechanism suitable for use with the instrument shown in Fig. 1.

Supported parallel to the shaft 44 is a track 48, having mounted thereon for translation a carriage 49, carrying a pen or stylus 50 adapted to inscribe a record on the chart 46 representative of relative motion between said stylus and said chart. Pivotally mounted upon the plate 41 are laterally disposed similar pulleys 51 and 52 spaced beyond the extremities of the track 48 and so positioned that a common tangent to said pulleys will lie parallel to said track and will intersect the carriage 49. The sector 42 is provided with an arcuate surface adapted to have wrapped thereon a flexible link such as a tape or cord 53, and is so disposed with respect to the other elements of the mechanism that said cord will form a common tangent to the pulleys 51 and 52 on the side where the common tangent does not intersect the carriage 49, and to the arcuate surface of the sector 42. The flexible link 53 is fixed at one of its extremities to a point on the sector 42 near one end of the arcuate surface of said sector, carried about said surface to a point near the extremity of a vertical radius of said surface, extended to pass about one of the pulleys 51 and 52, returned to the other of said pulleys, being intermediately secured to the carriage 49, brought about said last-mentioned pulley, and again engaged with the said arcuate surface and secured to the extremity of the same remote from its starting point. By this structure, any angular motion of the sector 42 about its pivotal axis will be reproduced as a translatory motion of the pen 50 with respect to the chart 46. Supported parallel to the track 48, and in close proximity thereto is a second track 55 having translatably mounted thereon a carriage 56 carrying a pen 57 engaging the chart 46 to follow thereon a path parallel to that followed by the pen 50 when said chart is at rest, said paths being separated only by such clearance as will permit said pens to pass freely at any point of their excursions. A lead screw 58 journalled parallel to the track 58 and releasably engaging the carriage 56, is adapted to be rotated at a constant speed by a timing motor or clock member 59, whereby said pen 57 may be caused to excurse across the chart 46 in a sense parallel to the axis of the shaft 44, at a constant velocity, and to inscribe thereon a graph representative of elapsed time. For purposes of compactness in representation of tests extending over time intervals of considerable duration, the clock mechanism is made reversible, so that at the end of a predetermined interval (e. g. 1 hour) it will automatically reverse the sense of travel of the carraige 56, causing the pen 57 to return toward its zero of reference at the same rate as it excursed therefrom during the first hour of the test. While the method by which this reversal is made automatic is immaterial from the standpoint of the purposes of the invention, there is shown in Fig. 3 one method by which it may be expediently accomplished. The clock 59 is shown as operated by a reversible synchronous motor, as, for example, the well known "Telechron" motor, having a rotor 60 and two independent windings 61 and 62, whereby, upon energization of either of the same, the other winding remaining deenergized, the rotor will revolve in a characteristic direction. Carried by the shaft of the rotor 60 is a pinion 63, meshing with a gear 64 mounted on the shaft of the lead screw 58 by which the carriage 56 is translated. Carried also by the shaft of the lead screw 58 is a pinion 65 meshing with a gear 66. The ratios of said pinions and gears are such that the lead screw 58 will be rotated at a rate to translate the pen carriage a distance corresponding to the width of the chart 46 (or slightly less) in the chosen standard time interval of (say) one hour, and the gear 66 will make substantially one revolution in the same time.

Pivotally mounted within the clock mechanism 59 is a double-pole mercury switch 67, adapted to be tripped and abruptly thrown from one to the other of two extreme positions by means of a pin 68 carried by the gear 66. The "outside" terminals of the switch 67 are connected to terminals of the windings 61 and 62 respectively, the free terminals of said windings being connected to a common conductor 71. The common terminal of the switch 67 is connected to a conductor 72. Upon the conductors 71 and 72 being connected to an alternating current source of suitable voltage, the rotor 60 will revolve, in a direction depending upon the position of the switch 67, and the carriage 56 will cause the pen 57 to excurse longitudinally of the drum 45 and in a corresponding direction. As the gear 66 completes a revolution and attains a position corresponding to one of the limits of travel of the pen carriage 56, the pin 68 will engage the mercury switch 67, throwing it to the opposite position from that formerly held, thus reversing the direction of the rotor 60, and causing the pen carriage 56, carrying the pen 57, to return at a uniform speed toward its zero of references.

The following is an outline of a typical cycle of operation of the apparatus as thus far described: A specimen 16 of the material whose characteristics it is desired to investigate is placed upon the pedestal 10 within the furnace 11, the quartz rods 25 and 28 brought into firm engagement with the specimen and the pedestal respectively, slack being taken up by the counterweight 32 which will eliminate lost motion. By manual rotation of the drum 45 and translation of the pens 50 and 57 the latter are set respectively to a temperature value corresponding to that of the specimen at the time of starting the test, and to a zero of time on the chart.

Upon the heating element 12 being energized from the electric source 13, the space within the furnace 11 will be heated, and the temperature of the specimen will rise, with a corresponding change in its linear dimensions. The change in temperature of the specimen, as measured by the thermocouple 18, and, through the circuit 19 and the mechanism 47, will cause the drum 45 to be rotated to an extent proportional to said temperature change. At the same time the linkage actuated by the rods 25 and 28 will cause the pen 50 in the recording instrument 40 to be moved axially of said drum, whereby there will be inscribed on the chart 46 carried by the drum a graph representing the elongation of the specimen 16 with respect to changes in its temperature.

Figure 4:
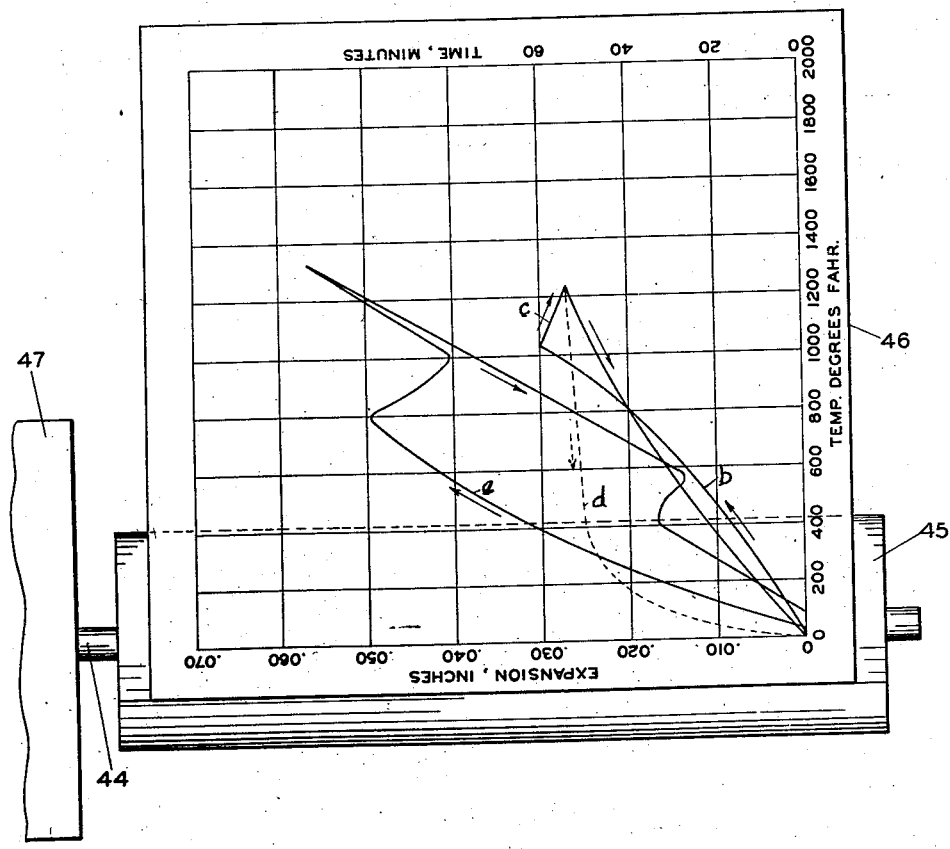
Fig. 4 is illustrative of the type of chart obtained from the instrument when being employed in the investigation of phenomena attending the heat treatment of metals.

In Fig. 4 is shown a typical chart as recorded by the instrument described. This chart 46 is indicated as being unwrapped from the drum 45. It will be noted that, while said drum and its mounting shaft 44 are normally disposed in a horizontal sense in the assembly of the instrument, the nature of the curves produced is such that for convenient reading, the edge of the chart which is at the right-hand end of the drum when being recorded becomes the bottom edge when being interpreted. The type of graph drawn by the pen 50, and representing the temperature expansion characteristics is indicated at $a$, and shows a general and fairly uniform elongation with temperature until there is attained a certain critical value corresponding to a "transformation point" of the metal under investigation. At this temperature there may take place an actual contraction of the specimen until a higher temperature is attained; and it is the position and shape of this irregularity in the curve that is of great importance in the investigation of metallurgical properties. After the transformation point is attained the power may be shut off from the heating element 19 and the specimen allowed to cool slowly, or the furnace may be opened on its hinges 14 and removed, and the tank 15 containing a suitable quenching liquid quickly elevated about the specimen. In either case the cooling curve will take the general nature indicated in Fig. 4.

The graph drawn by the pen 57 as the carriage 56 is moved along the track 55 at a uniform rate by the clock mechanism 59 is shown at $b$ in Fig. 4, said pen continuing to advance across the chart throughout the test, or until the lapse of the time interval established by the reversing gear in the timing mechanism, when the pen 57 will begin to return toward its zero of reference. The latter condition is shown at $c$ in Fig. 4, where the heating of the specimen is considered as having continued beyond the duration of the established time interval; while rapid cooling attendant upon quenching will cause the time graph to take the form shown dotted at $d$ in Fig. 4.

Figure 2:
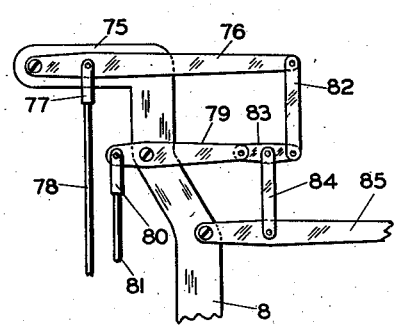
Fig. 2 is a side elevation of certain elements of mechanism which may be used alternatively with the corresponding parts shown in Fig. 1.

In Fig. 2 is shown an alternative form of linkage for transmission of dimensional changes of a specimen under test to a suitable recording mechanism. A bracket portion 75 projecting from the base 8 has fulcrumed thereon a lever 76 of the third class, upon which is pivoted a clamping member 77 carrying a rod 78 of quartz or the like, said clamping member and rod corresponding exactly in location and dimensions with the clamping member 24 and the rod 25 respectively, shown in Fig. 1. Fulcrumed on the bracket 75 is a second lever 79 having oppositely extended arms of different lengths, to give a ratio equal to that of the arms of the lever 76, the shorter of said arms having pivoted thereon a clamping member 80 carrying a quartz rod 81, said last named clamping member and rod corresponding exactly in location and dimensions to the clamping member 27 and rod 28 shown in Fig. 1. Jointly supported by the extremity of the longer arm of the lever 79 and by a link 82 carried by the longer arm of the lever 76 is a "whiffletree" or floating lever 83 having pivoted midway between its points of support a link 84 pivoted in turn to an extended lever 85 of the third order, fulcrumed on the base 8 or the bracket portion 75 thereof, and identical in all respects with the lever member 31 shown in Fig. 1. All elements of the mechanism other than those definitely described as shown in Fig. 2 are identical with those shown in Fig. 1.

The operation of the linkage as shown in Fig. 2 is as follows: Upon extension of the specimen upon which rests the rod 78, the lever member 76 will be rotated in a counter-clockwise sense about its fulcrum, causing the right-hand extremity as shown in the drawings to be elevated, and similarly to elevate the right hand extremity of the floating lever 83, and, if the lever member 79 be for the moment considered as stationary, to cause the extended lever 85 to be rotated about its fulcrum in a counter-clockwise sense. Change in the vertical distance between the upper surface of the pedestal 10 and the pivot bearing of the lever 76, due to distortion of the supporting framework, or to any other cause than dimensional change in the specimen proper, will effect corresponding displacements of the rods 78 and 81, which, being communicated to the lever members 76 and 79 through the clamps 77 and 80, will shift the respective ends of the floating lever 83 about the pivotal mounting of said lever on the link 84, and thus will compensate for such displacement in a manner similar to that in which compensation is effected in the form of mechanism shown in Fig. 1 of the drawings.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a dilatometer having a heating furnace, a supporting member projecting from outside the furnace to a position therein without touching the furnace and adapted to support within the furnace a specimen to be tested, an exhibiting instrument, connecting means comprising an element abutting upon said specimen and extending outside the furnace and a linkage adapted to impart to said instrument motion representative of displacement of the point of contact between said specimen and said element, and further connecting means comprising a second element abutting upon said supporting member and parts connected to said linkage to superimpose on the motion of the same a motion representative of the displacement of said support and in a sense to eliminate from the motion imparted to said instrument a component representative of said last-named displacement.

2. In a dilatometer having a heating furnace, a supporting member projecting from outside the furnace to a position therein without touching the furnace and adapted to support within the furnace a specimen to be tested, an exhibiting instrument, a lever arm adapted to impart to said instrument a displacement to be exhibited, a floating lever pivoted intermediate its extremities on said lever arm, first connecting means comprising an element abutting upon said specimen and extending outside the furnace and a linkage attached to said element and to one of the extremities of said floating lever to impart to the same motion representative of the displacement of the point of contact between said specimen and said element, and second connecting means comprising an element abutting upon said supporting member and extending outside the furnace and a linkage attached to said last named element and to the other of the extremities of said floating lever to impart to the same motion representative of displacement of said supporting member but in the reverse sense to the motion imparted by said first connecting means, whereby said floating lever will impart to said lever-arm motion representative only of change in a dimension of said specimen.

3. In a dilatometer having a heating furnace, a supporting member projecting from outside the furnace to a position therein without touching the furnace and adapted to support within the furnace a specimen to be tested, an exhibiting instrument, an extended rod of material having a low coefficient of thermal expansion abutting upon said specimen and extending outside the furnace, a second extended rod of similar material, abutting upon said supporting member and extending outside the furnace, and linkage connected to said rods and including a differential lever whereby a displacement representative of the resultant of the combined displacements of said rods will be imparted to said instrument.

4. In a dilatometer having a heating furnace, a supporting member projecting from outside the furnace to a position therein without touching the furnace and adapted to support within the furnace a specimen to be tested, an exhibiting instrument, a lever arm adapted to impart to said instrument a displacement to be exhibited, a link connected to said lever arm, a floating lever pivoted intermediate its extremities on said link, first connecting means comprising an element abutting upon said specimen and extending outside the furnace and a linkage attached to said element and to one of the extremities of said floating lever to impart to the same motion representative of the displacement of the point of contact between said specimen and said element, and second connecting means comprising an element abutting upon said supporting member and extending outside the furnace and a linkage attached to said last named element and to the other of the extremities of said floating lever to impart to the same motion representative of displacement of said supporting member but in the reverse sense to the motion imparted by said first connecting means, whereby said floating lever will impart to said lever arm motion representative only of change in a dimension of said specimen.

5. In a dilatometer having a heating furnace, a supporting member projecting from outside the furnace to a position therein without touching the furnace and adapted to support within the furnace a specimen to be tested, an exhibiting instrument, a member adapted to impart to said instrument a displacement to be exhibited, an element abutting said specimen and extending outside said furnace, an element abutting said support and extending outside said furnace, and means comprising linkage connected to said elements and including a differential lever for imparting to said instrument motion representative only of change in a dimension of said specimen.

6. In a dilatometer having a heating furnace, means in said furnace for supporting a specimen to be tested, a chart member having rectangular coordinates, a member for recording on said chart member, means responsive to the temperature of said specimen, means responsive to dimensional changes in said specimen and said supporting means, means responsive to dimensional changes in said supporting means only, means controlled by said temperature responsive means for actuating one of said members, and means differentially subject to the joint influence of both said dimensional responsive means for imparting to the other of said members motion representative only of change in a dimension of said specimen.

7. In a dilatometer having a heating furnace, means in said furnace for supporting a specimen to be tested, means responsive to dimensional changes in said specimen and said supporting means, means responsive to dimensional changes in said supporting means only, recording means, and means differentially subject to the joint influence of both said responsive means for imparting to said recording means motion representative only of a change in a dimension of said specimen.

8. In a dilatometer having a heating furnace, means in said furnace for supporting a specimen to be tested, means responsive to dimensional changes in said specimen and said supporting means, means responsive to dimensional changes in said supporting means only, recording means, and means including a floating lever differentially influenced by said responsive means for imparting to said recording means motion representative only of a change in a dimension of said specimen.

9. In a dilatometer having a heating furnace, means in said furnace for supporting a specimen to be tested, a chart member having rectangular coordinates, a member for recording on said chart member, means responsive to the temperature of said specimen, means responsive to dimensional changes in said specimen and said supporting means, means responsive to dimensional changes in said supporting means only, means controlled by said temperature responsive means for actuating one of said members, and means including a floating lever differentially influenced by said dimensional responsive means for imparting to the other of said members motion representative only of change in a dimension of said specimen.

10. In a dilatometer having a heating furnace, means in said furnace for supporting a specimen to be tested, a rotatable member, a chart on said member having rectangular coordinates, means responsive to the temperature of said specimen, means responsive to dimensional changes in said specimen, means responsive to dimensional changes in said supporting means, means controlled by the temperature responsive means for rotating said member, and means comprising a linkage differentially subject to both said dimensional responsive means to provide a record on said chart.

11. In a dilatometer having a heating furnace, means in said furnace for supporting a specimen to be tested, a chart member having rectangular coordinates, a member for recording on said chart member, means responsive to the temperature of said specimen, means responsive to dimensional changes in said specimen, means responsive to dimensional changes in said supporting means, means controlled by said temperature responsive means for actuating one of said members, and differential means controlled jointly by both said dimensional responsive means for imparting to the other of said members motion representative only of change in a dimension of said specimen.

12. In a dilatometer having a heating furnace, means in said furnace for supporting a specimen to be tested, means responsive to dimensional changes in said specimen, means responsive to dimensional changes in said supporting means, recording means, and differential means controlled jointly by both said responsive means for imparting to said recording means motion representative only of a change in a dimension of said specimen.

13. In a dilatometer having a heating furnace, means in said furnace for supporting a specimen to be tested, means responsive to dimensional changes in said specimen, means responsive to dimensional changes in said supporting means, recording means, and means including a floating lever controlled jointly by both said responsive means for imparting to said recording means motion representative only of a change in a dimension of said specimen.

CHARLES F. WETHERBEE.